Dec. 27, 1960 R. E. KORTUM 2,966,365
LAWN MOWER HANDLE
Filed Dec. 8, 1958

INVENTOR.
ROBERT E. KORTUM
BY *Cohn and Powell*
ATTORNEYS

United States Patent Office 2,966,365
Patented Dec. 27, 1960

2,966,365
LAWN MOWER HANDLE

Robert E. Kortum, Robertson, Mo., assignor to Atlas Tool & Manufacturing Co., St. Louis, Mo., a corporation of Missouri Filed Dec. 8, 1958, Ser. No. 778,761
2 Claims. (Cl. 280—47.37)

This invention relates generally to improvements in a lawn mower, and more particularly to an improved mechanism for attaching a handle to the mower casing.

It is an important object to provide an mechanism that will selectively latch the handle in an inclined operable position and yet enable the handle to be moved to a substantially upright position for facilitating storage.

An important objective is achieved by the provision of a latch arm on the pivot connection between the handle and a casing bracket which enables the previously mentioned functional results and advantages.

Another important object is realized by providing a latch means that moves with the handle and automatically locks the handle in its operative position when moved to such position, and which can be selectively released to permit the handle to be swung upright.

Still another important objective is realized in that the mechanism includes means for holding the handle in the upright position slightly beyond the vertical plane through the pivot axis, such position being utilized in storing the mower.

Yet another important objective is realized in providing a mechanism of this type that is simple and durable in construction, economical to manufacture and assemble, efficient in operation and which is capable of use by any one.

The foregoing and numerous other objects and advantages of the invention will more clearly appear from the following detailed description of a preferred embodiment, particularly when considered in connection with the acccompanying drawing, in which.

Figure 1:
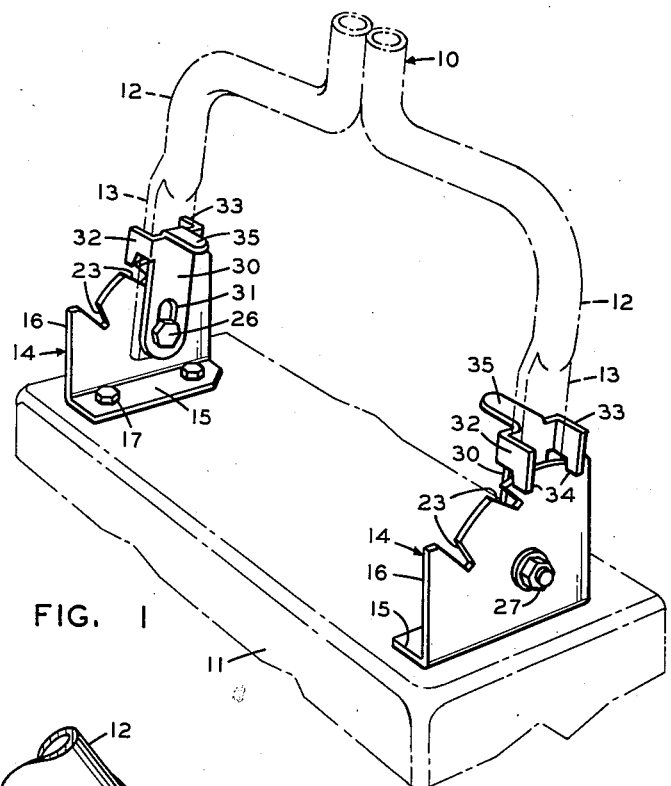
Fig. 1 is a perspective view of the mechanism attaching the handle to the mower casing.
Figure 4:
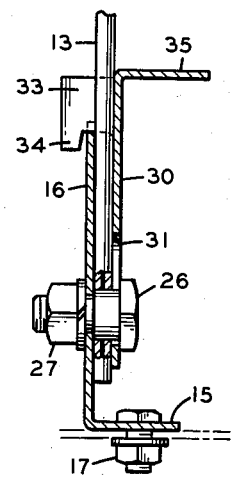
Fig. 4 is a cross sectional view of the mechanism as seen along line 4—4 of Fig. 3.

Referring now by characters of reference to the drawings, and first to Fig. 1, it is seen that the invention is particularly adapted for use in a lawn mower. The mower can be of any conventional type. Fig. 1 illustrates the attachment of a handle generally indicated at 10 to a mower casing referred to at 11. It is thought that Fig. 1 discloses the environment of the invention without requiring the detailed structure of any particular mower.

The handle 10 includes a pair of spaced arms 12 at its lower end. The end 13 of each arm 12 is flattened to facilitate attachment to the casing 11 in a manner which will be described fully.

The mechanism designed to attach each end 13 of handle 10 to the mower casing 11 is identical in construction and function, the only exception being that one mechanism is a left hand assembly while the other is a right hand assembly. Accordingly, a detailed description of one mechanism will suffice for the other.

Each mechanism includes a bracket indicated at 14 of substantially L-shape having a lower flange 15 and an upstanding bracket portion 16. As is best seen in Fig. 1, the brackets 14 in assembly are disposed in spaced opposed relationship with the flanges 15 faced toward each other. A plurality of bolts and nuts 17 fasten the flange 15 of bracket 14 to the mower casing 11.

The upper margin of bracket portion 16 is defined by end shoulders 20 and 21 interconnected by a substantially arcuate edge portion 22. A pair of notches 23 are formed in the arcuate edge portion 22, the notches 23 extending inwardly in spaced relationship. The notches 23 are partially defined by opposed abutments 24 and 25, the purpose of function of which will become fully apparent upon subsequent description of parts. It will be noted that one of notches 23 extends directly inward from the end shoulder 20 and that its abutment 24 constitutes a continuation of such shoulder 20.

The handle end 13 is pivotally attached to the bracket portion 16 of bracket 14 by a spacer bolt 26 and nut 27 constituting a pivot means. The handle end 13 extends upwardly contiguous to the bracket portion 16 and is swingable about the pivot bolt 26.

A latch member 30 is pivotally connected to the bracket 14 and handle end 13 by the same pivot bolt 26, the latch member 30 extending along the handle end 13. The latch member 30 is provided with an elongate slot 31 in which the pivot bolt 26 is relatively movable.

A pair of arms 32 and 33 are provided integrally on latch member 30, such arms 32 and 33 extending on opposite sides of the handle end 13 beyond the bracket portion 16. For convenience, each of arms 33 includes a hook portion 34 extending downwardly over the upper margin of the bracket portion 16 in order to facilitate attachment of the latch member and to guide the latch member during swinging movement.

For reasons which will later appear, each latch member 30 is provided with a tab 35 adapted to be digitally engaged to manipulate the latch member 30.

Figure 3:
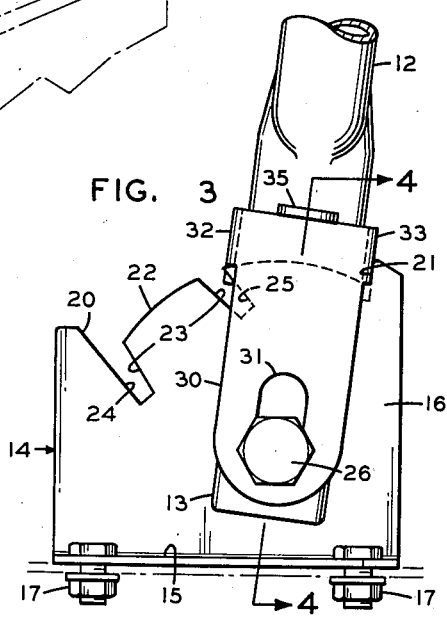
Fig. 3 is an elevational view of the opposite side of the mechanism shown in Fig. 2.

Figs. 1 and 3 illustrate the position of the handle end 13 and latch member 30 relative to the bracket 14 when the handle 10 is disposed in its substantially upright position more conveniently utilized during storage of the mower. It will be noted that in this inoperative storage position, the arms 32 seat on the arcuate edge portion 22 and that the pivot bolt 26 is located at the bottom limit of latch member slot 31. Furthermore, one of the arms 33 engages the end shoulder 21 to hold the handle 10 in a position slightly beyond a vertical plane passed through the pivot bolt 26. The weight of the handle 10 tends under gravity to urge the latch member arm 33 against shoulder 21 and hence holds the handle 10 in this substantially upright position.

Figure 2:
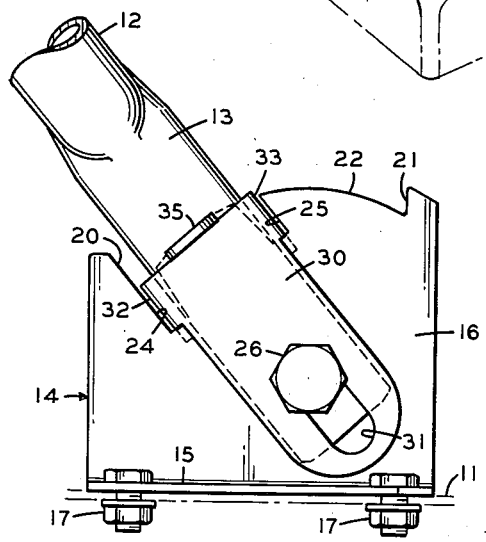
Fig. 2 is an elevational view of one side of the assembly shown on the left hand side of Fig. 1.

When it is desired to utilize the mower, the handle 10 is merely swung downwardly from the position shown in Fig. 3 to the position shown in Fig. 2. During this swinging movement about pivot bolt 26, the latch member arms 32 and 33 ride upon the arcuate edge portion 22 until the one latch arm 32 engages the opposite bracket shoulder 20. It will be noted that the latch member 30 is pivotally moved with the handle 10 because the arms 32 and 33 engage the opposite sides of the handle end 13.

After the latch member 30 engages the bracket shoulder 20, the latch member 30 moves downwardly as permitted by the relative movement of pivot bolt 26 to the upper end of slot 31 so that the arms 32 and 33 enter the notches 23. Movement of the latch member 30 into this latching position illustrated in Fig. 2 is accomplished either automatically under the gravitational force exerted on the latch member 30, or can be accomplished manually by the operator. In this latched position, the arms 32 and 33 engage respectively the opposed abutments 24 and 25 to prevent pivotal movement of the handle end 13. Thus it is seen that the handle 10 is held in an operative position ready for effective and efficient use of the mower.

After the mower has been utilized and it is desired to move the handle 10 to its substantially upright out-of-the-way position for storage, the operator grips the tap 35 of the latch member 30 and raises the arms 32 and 33 out of notches 23, as permitted by the relative movement of pivot bolt 26 along slot 31. When the latch arms 32 and 33 clear the notches 23, the handle 10 is swung upwardly about the pivot axis. As explained previously, the latch member 30 is pivotally moved along with the handle ends 13, the arms 32 and 33 riding along the arcuate edge portion 22. As the handle end 13 and latch member 30 are pivotally moved from its angular position on one side of a vertical plane passed through the pivot axis, illustrated in Fig. 2, to the substantially upright position at the other side of the vertical plane passed through the pivot axis, illustrated in Fig. 3, the latch arm 33 engages the bracket shoulder 21 so as to hold the handle 10 in the storage position as previously described.

It will be realized that the handle 10 can be effectively and efficiently latched and released in the manner previously described, if only one handle end 13 were connected by the mechanism described while the opposite end 13 were merely pivotally attached to a bracket. However, a more efficient and durable structure is realized when the mechanism is utilized to connect each handle end 13, as is illustrated in Fig. 1.

Although the invention has been described by making detailed reference to a single preferred embodiment, such detail is to be understood in an instructive, rather than in any restrictive sense, many variants being possible within the scope of the claims hereunto appended.

I claim as my invention:

1. Mechanism for attaching a handle to a mower casing including a bracket attached to the casing, pivot means fixing the handle to said bracket, the bracket including an arcuate margin formed by a radius from said pivot means, a latch member provided with a slot in which the pivot means is slidably received, the bracket provided with opposed abutments on said arcuate margin, the latch member having a pair of arms one embracing each side of said handle in the direction of handle movement, the arms engaging said abutments to preclude movement of said handle in one position, the arms disengaging from said abutments upon movement of said latch member as permitted by the relative movement of said pivot means in said slot, to enable pivoting of said handle and said latch number, the arms including hooks extending over said arcuate margin to guide said latch member.

2. Mechanism for attaching a handle to a mower casing including a bracket attached to the casing, pivot means connecting said handle to said bracket, the bracket including an arcuate margin formed by a radius from said pivot means, a latch member connected to said bracket by said pivot means, the bracket being provided with notches in said arcuate margin on opposite sides of said handle in one position of said handle, the latch member including arms extending on opposite sides of said handle in the direction of handle movement and engaging the bracket in said notches to preclude pivotal movement of said handle, the latch member provided with a slot in which said pivot means is slidably received, the arms disengaging from said notches upon relative movement of said pivot means in said slot enabling pivotal movement of said handle and said latch member together, the arms including hooks overlapping the arcuate margin to guide the latch member during pivotal movement and to facilitate attachment of the arms in said notches.

References Cited in the file of this patent

UNITED STATES PATENTS

| | | |
|---|---|---|
| 599,208 | White | Feb. 15, 1898 |
| 2,285,700 | Feldman | June 9, 1942 |
| 2,291,250 | Nielsen | July 28, 1942 |
| 2,716,559 | Boyce | Aug. 30, 1955 |
| 2,725,946 | Welter | Dec. 6, 1955 |
| 2,758,847 | Shone | Aug. 14, 1956 |
| 2,761,691 | George | Sept. 4, 1956 |
| 2,763,492 | Phelps | Sept. 18, 1956 |
| 2,786,694 | Gray | Mar. 26, 1957 |

FOREIGN PATENTS

| | | |
|---|---|---|
| 169,326 | Great Britain | Sept. 29, 1921 |